(12) United States Patent
Keramane

(10) Patent No.: US 7,174,567 B2
(45) Date of Patent: Feb. 6, 2007

(54) DIGITAL RIGHTS MANAGEMENT APPARATUS, METHODS AND MULTIMEDIA PRODUCTS USING BIOMETRIC DATA

(75) Inventor: Cherif Keramane, Morrisville, NC (US)

(73) Assignee: Sony Ericsson Mobile Communications AB (SE)

( * ) Notice: Subject to any disclaimer, the term of this patent is extended or adjusted under 35 U.S.C. 154(b) by 790 days.

(21) Appl. No.: 10/267,560

(22) Filed: Oct. 9, 2002

(65) Prior Publication Data

US 2004/0073803 A1 Apr. 15, 2004

(51) Int. Cl.
*H04L 9/32* (2006.01)
*H04N 7/16* (2006.01)

(52) U.S. Cl. .................. 726/26; 713/186; 713/193; 726/27; 726/28

(58) Field of Classification Search .......... 726/33, 726/30, 29, 28, 27
See application file for complete search history.

(56) References Cited

U.S. PATENT DOCUMENTS

| | | | |
|---|---|---|---|
| 6,122,737 A | 9/2000 | Bjorn et al. | |
| 6,151,634 A | 11/2000 | Glaser et al. | |
| 6,208,746 B1* | 3/2001 | Musgrave | 382/100 |
| 6,550,011 B1* | 4/2003 | Sims, III | 713/193 |
| 6,553,494 B1* | 4/2003 | Glass | 713/186 |
| 6,697,947 B1* | 2/2004 | Matyas et al. | 713/182 |
| 2002/0065784 A1* | 5/2002 | Ranzini et al. | 705/64 |
| 2002/0066040 A1* | 5/2002 | Rozenberg | 713/202 |
| 2002/0138743 A1* | 9/2002 | Murakami et al. | 713/186 |
| 2002/0188854 A1* | 12/2002 | Heaven et al. | 713/186 |
| 2003/0070079 A1* | 4/2003 | Cromer et al. | 713/186 |
| 2003/0188183 A1* | 10/2003 | Lee et al. | 713/200 |

OTHER PUBLICATIONS

Soutar et al., *Biometric Encryption*, ICSA Guide to Cryptography, Chapter 22, pp. 1-28 (1999).
International Search Report, PCT/US03/30448, Jun. 8, 2004.
Rosenblatt et al., *Digital Rights Management: Business and Technology*, John Wiley & Sons, Sep. 15, 2001, pp. 231-232.
Musicrypt Inc, *Musicrypt Licenses Biopassword From Net Nanny, Provides Biometric Security for Digital Music Transactions*, http://www.musicrypt.com/news/Net_Nanny.asp, Jun. 12, 2000.
*Guide to the SDMI Portable Device Specificatiion, Part 1, Version 1.0*, Feb. 26, 1999.
Press release, *Sony Announces MagicGate Memory Stick™*, Sep. 22, 1999.
STMicroelectronics, *Biometric Technologies Overview* and *SmartFinger™ Single Module for Fingerprint Recognition and On-Screen Navigation*, 2001.
*Frequently Asked Questions* (FAQ) at e-books.org, 2002.

* cited by examiner

*Primary Examiner*—Gilberto Barrón, Jr.
*Assistant Examiner*—Thomas Szymanski
(74) *Attorney, Agent, or Firm*—Myers Bigel Sibley & Sajovec, P.A.

(57) ABSTRACT

Biometric data, such as fingerprint data, of at least one authorized user of a digital multimedia product is embedded into a digital multimedia product, to thereby control use of the digital multimedia product by a prospective user who obtains access to the digital multimedia product. The digital multimedia product, including the biometric data of the at least one authorized user that is embedded therein, is stored in a digital storage medium. At least some use of the digital multimedia product by a prospective user is prevented upon failure to match biometric data of the prospective user to the biometric data that is embedded in the digital multimedia product.

19 Claims, 3 Drawing Sheets

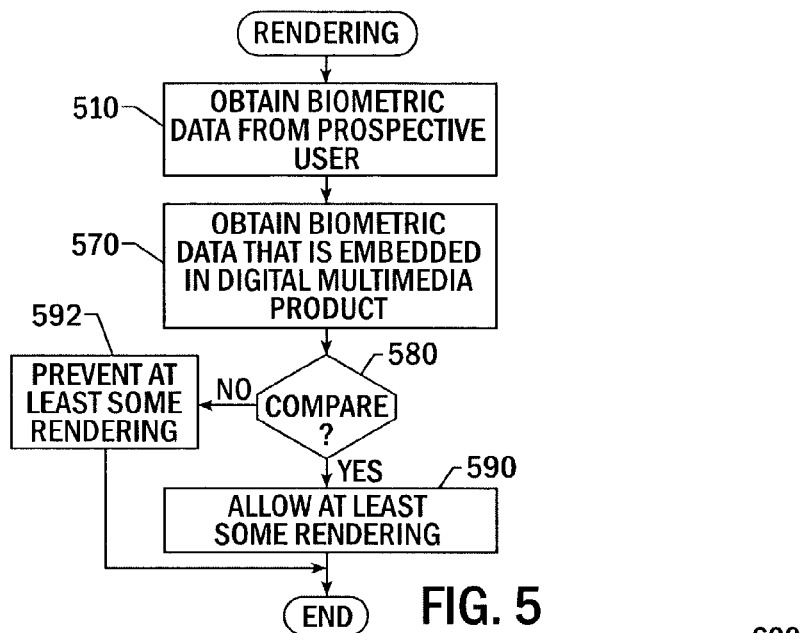
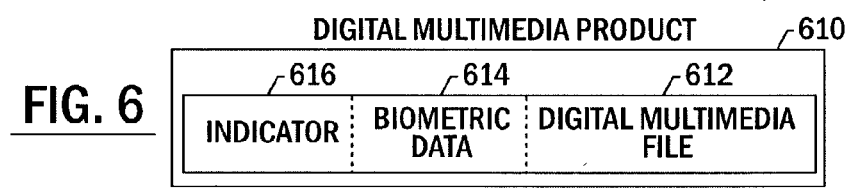
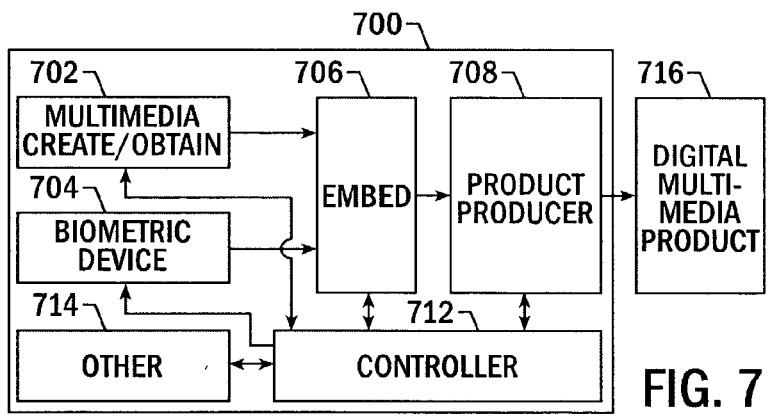
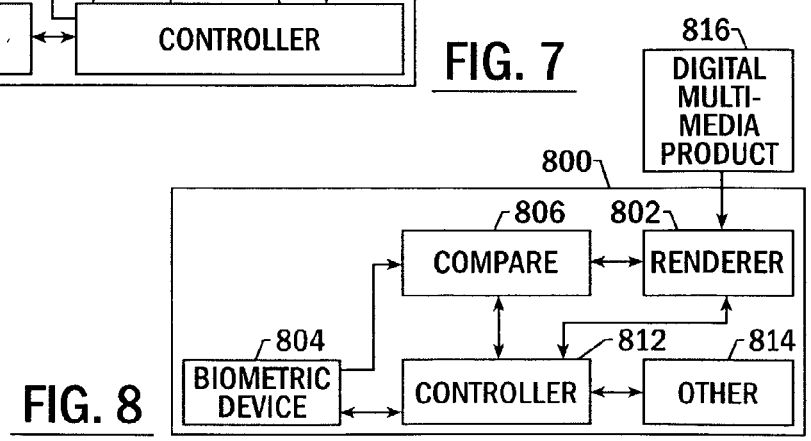

DIGITAL RIGHTS MANAGEMENT APPARATUS, METHODS AND MULTIMEDIA PRODUCTS USING BIOMETRIC DATA

FIELD OF THE INVENTION

This invention relates to digital multimedia products, and more specifically to digital rights management apparatus and methods for digital multimedia products and digital multimedia products employing the same.

BACKGROUND OF THE INVENTION

Digital multimedia products are widely used for entertainment, education and/or other purposes. As used herein, the term "digital multimedia" includes digital audio, digital video and/or digital images which may be embodied in digital multimedia products including, for example, compact discs (CD), digital video discs (DVD), video game products, digital television (DTV) products, memory devices that include digital multimedia files, and digital multimedia files that are distributed over computer networks, such as the World Wide Web, via satellite and/or via cable networks.

With the proliferation of apparatus and methods for producing digital multimedia products, such as digital audio recorders and digital cameras, and multimedia product rendering (using) apparatus, such as digital audio and/or video players, concerns have been raised by owners of copyright and other intellectual property rights in digital multimedia products. These concerns have led to the use and/or proposal of Digital Rights Management (DRM) technologies. These DRM technologies may enable an authorized user of a digital multimedia product to use the product, and may include the ability to copy the product under certain circumstances. DRM technologies also may prohibit unauthorized use by the authorized user, such as sending the digital multimedia product by email and/or publishing the digital multimedia product on the World Wide Web, and may also prohibit use by an unauthorized user.

For example, streaming audio and/or video communications systems and methods, such as marketed by RealNetworks, Inc., Seattle, Wash., can provide real-time playback of audio and/or video data transferred via telephone lines or other communications links. See, for example, U.S. Pat. No. 6,151,634 to Glaser et al. entitled Audio-on-Demand Communication System. DRM may be handled by discarding the data after rendering and/or by allowing the user to register with a DRM server for repeated access.

Another DRM technique is the Secure Digital Music Initiative (SDMI), which allows a limited number of digital copies of a digital multimedia file to be made by integrating a watermark in the file, recording the number of permissible copies, and decrementing this number each time a copy is made. See, for example, *Guide to the SDMI Portable Device Specification, Part 1, Version* 1.0, Feb. 26, 1999.

Yet another example of DRM technology is the Sony "MagicGate Memory Stick™", which is a compact integrated circuit recording media equipped with "MagicGate" copyright protection technology. MagicGate is a copyright protection technology that consists of an authentication technology and an encryption technology. Authentication technology ensures that protected content is only transferred between compliant devices and media, and protected content is recorded and transferred in an encrypted format to prevent unauthorized copying or playback. See the press release dated Sep. 22, 1999, entitled *Sony Announces "MagicGate Memory Stick™*.

Other DRM technologies may allow a user to store a purchased media product only on a particular device, but may block the user from transferring it outside the device. For example, nearly all current electronic book (e-book) titles sold by trade and academic publishers include some form of security that restricts copying or moving them once they have been downloaded to a personal computer or e-book reading appliance. See, the *Frequently Asked Questions* (FAQ) at e-books.org, 2002, question entitled "How can I copy or move e-book content from one reading appliance to another?".

SUMMARY OF THE INVENTION

Some embodiments of the present invention embed biometric data, such as fingerprint data, of at least one authorized user of a digital multimedia product into the digital multimedia product, to thereby control use of the digital multimedia product by a prospective user who obtains access to the digital multimedia product. In other embodiments, the digital multimedia product, including the biometric data of the at least one authorized user that is embedded therein, is stored in a digital storage medium. In still other embodiments, at least some use of the digital multimedia product by a prospective user is prevented upon failure to match biometric data of the prospective user to the biometric data that is embedded in the digital multimedia product.

Apparatus and methods according to some embodiments of the present invention may be used upon creation of a digital multimedia product, by creating a digital multimedia file that corresponds to the digital multimedia product, obtaining the biometric data of the creator of the digital multimedia file and/or at least one designee of the creator, and embedding the biometric data into the digital multimedia product. Apparatus and methods according to other embodiments of the invention may be used upon purchase of the digital multimedia product, wherein a digital multimedia file that corresponds to the digital multimedia product is obtained and biometric data of a purchaser of the digital multimedia product and/or at least one designee of the purchaser is obtained. The biometric data is embedded into the digital multimedia product.

Digital multimedia products according to some embodiments of the present invention comprise a digital storage medium having digital data embodied in the medium. The digital data comprises a digital multimedia file and biometric data of at least one authorized user of the digital multimedia product. Other embodiments of digital multimedia products also include an indicator that is configured to indicate a number of additional authorized users for whom biometric data may be embedded in the digital multimedia product.

Apparatus or systems for producing a digital multimedia product, according to some embodiments of the present invention, are configured to obtain a digital multimedia file, to obtain biometric data of at least one authorized user of the digital multimedia product, to embed the biometric data of the at least one authorized user into the digital multimedia file, and to store the digital multimedia file including the biometric data that is embedded therein in a digital storage medium. Some embodiments of apparatus for producing a digital multimedia product may be configured to create the digital multimedia file in response to input by a creator of the digital multimedia file and/or at least one designee of the creator of the digital multimedia file. Other embodiments of apparatus for producing a digital multimedia product according to embodiments of the present invention may be configured to obtain the digital multimedia file in response to a request by a purchaser of the digital multimedia product and to obtain and embed biometric data of the purchaser and/or at least one designee of the purchaser of the digital multimedia product.

Apparatus for rendering a digital multimedia product according to some embodiments of the invention are configured to obtain biometric data of a prospective user of the digital multimedia product, to read the digital multimedia product to obtain biometric data that is embedded therein, and to prevent at least some rendering of the digital multimedia product upon failure to match the biometric data of the prospective user to the biometric data that is embedded in the digital multimedia product. In some embodiments, the biometric data is obtained in response to activation of the apparatus, and may be used repeatedly when digital multimedia products are activated in the apparatus. In other embodiments, the biometric data is obtained in response to activation of the digital multimedia product in the apparatus.

BRIEF DESCRIPTION OF THE DRAWINGS

FIG. 5 is a flowchart of operations for rendering a digital multimedia product according to some embodiments of present invention.

FIG. 6 is a block diagram of digital multimedia products according to some embodiments of the present invention.

FIG. 7 is a block diagram of apparatus for producing digital multimedia products according to some embodiments of the present invention.

FIG. 8 is a block diagram of apparatus for rendering digital multimedia products according to some embodiments of the present invention.

DETAILED DESCRIPTION OF PREFERRED EMBODIMENTS

Figure 1:
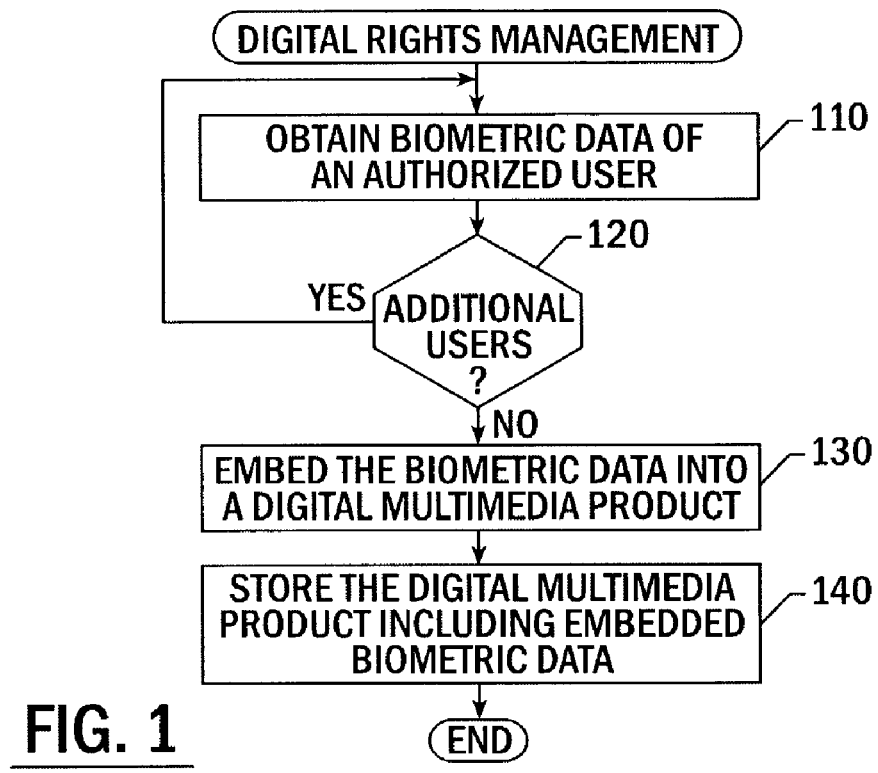
FIG. 1 is a flowchart of operations for digital rights management according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method and/or an apparatus. The present invention may take the form of an entirely hardware embodiment, an entirely software embodiment or an embodiment combining software and hardware aspects, all generally referred to herein as a "circuit." Furthermore, the present invention may be embodied as a digital multimedia product on a digital storage medium having digital data embodied in the medium. Any suitable digital storage medium may be utilized, including a memory device, hard disk, CD-ROM, optical storage device, transmission medium, such as a wireless transmission medium and/or those supporting the Internet or an intranet, and/or a magnetic storage device.

The present invention is described below with reference to block diagrams and/or flowchart illustrations of methods, apparatus (systems) and/or digital multimedia products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a flowchart of operations for digital rights management according to some embodiments of the present invention. In general, some embodiments of the present invention can provide digital rights management by binding a digital multimedia product to an authorized user's identity using biometric data of the authorized user.

More specifically, referring to FIG. 1, biometric data of an authorized user is obtained at Block 110. The biometric data may be obtained from the authorized user contemporaneously, or prestored biometric data may be obtained. As is well known to those having skill in the art, biometric data corresponds to any data based on physical characteristics of an individual that may be used to uniquely identify the individual and can include, for example, fingerprint data, retinal data, DNA data and/or other types of data. The obtaining of biometric data for various authentication and security applications is well known to those having skill in the art, and need not be described further herein. Moreover, apparatus or devices that may be used to capture biometric data also are well known to those having skill in the art, and need not be described further herein. See, for example, the publications by STMicroelectronics entitled *Biometric Technologies Overview* and *SmartFinger™ Single Module for Fingerprint Recognition and On-Screen Navigation,* 2001.

Still referring to Block 110 of FIG. 1, the authorized user of the digital multimedia product can comprise a creator and/or a designee of the creator of a digital multimedia file that corresponds to the digital multimedia product, in some embodiments of the present invention. In other embodiments of the present invention, the authorized user can comprise a purchaser and/or at least one designee of the purchaser of the digital multimedia product. It will be understood that as used herein, the term "purchaser" includes an owner and/or a licensee of the digital multimedia product. In yet other embodiments, the at least one authorized user can comprise the purchaser, the creator and/or at least one designee of the purchaser and/or the creator of the digital multimedia file or product. Since more than one authorized user may be present, at Block 120, a test is made as to whether additional users are authorized and, if so, biometric data for these additional authorized users also is obtained contemporaneously or as was prestored. As will be described below, if biometric data of all of the additional authorized users is not available, an indicator may be used to indicate a number of additional authorized users with missing biometric data. An identification of the additional authorized users also may be provided by the indicator.

Referring again to FIG. 1, at Block 130, the obtained biometric data is embedded into a digital multimedia product. In some embodiments of the present invention, such as embodiments described in FIG. 3, the digital multimedia product may include a preexisting digital multimedia file. In other embodiments of the present invention, such as embodiments described in FIG. 2, the digital multimedia file may be a newly created digital multimedia file for which digital rights management is desired. The biometric data is embedded into the digital multimedia product at Block 130 using any of many conventional techniques. In some embodiments, the biometric data is embedded into the digital multimedia file itself. For example, in some embodiments, the biometric data is appended to the digital multimedia file. In other embodiments, the biometric data is interspersed into the digital multimedia file, which may make it more difficult for an unauthorized user to separately access the biometric data. In still other embodiments, the biometric data may be embedded in the digital multimedia file in a way that is even more difficult to remove. For example, some or all of the file may be encrypted and/or other tamper-resistant/tamper-detection techniques may be used. In yet other embodiments, the biometric data is embedded into the multimedia product, separate from the digital multimedia file.

It also will be understood that a single embedding operation may be performed at Block 130 to embed the biometric data of a plurality of users into a digital multimedia product. In other embodiments, a respective embedding operation may be performed for a respective authorized user. The embedding may be performed up to a predetermined number of times, to thereby embed biometric data of up to the predetermined number of authorized users of the digital multimedia product into the digital multimedia product. Thus, a predetermined number of authorized users may be allowed.

Still referring to FIG. 1, some embodiments of the present invention also store a digital multimedia product including the embedded biometric data, in a digital storage medium at Block 140. As used herein, a digital storage medium comprises any digital storage medium having digital multimedia data embodied therein, including but not limited to compact discs (CD), digital video discs (DVD), video game products, other nonvolatile solid-state memory devices such as memory stick devices, and/or volatile memory storage media, such as random access memory devices, and also includes storage in a computer network, such as a World Wide Web server, for distribution. The digital multimedia product may be produced in a centralized apparatus in which the biometric data is embedded into the digital multimedia product. In other embodiments, a distributed apparatus may be provided wherein the digital multimedia file and/or product is produced remote from the location in which the biometric data is embedded.

Figure 2:
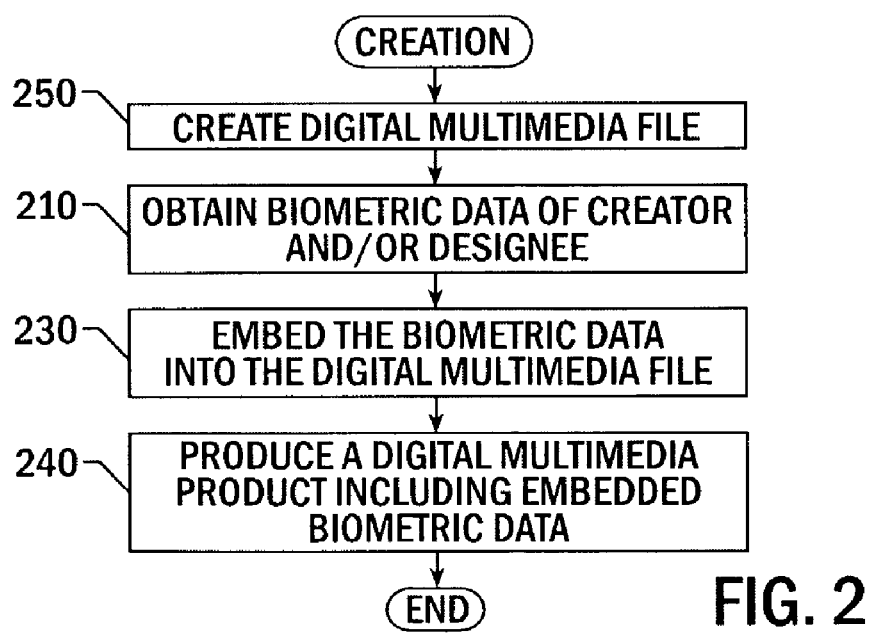
FIG. 2 is a flowchart of operations for digital rights management at a point-of-creation according to some embodiments of the present invention.

FIG. 2 is a flowchart of operations for digital rights management according to other embodiments of the present invention that may be used upon creation of a digital multimedia file. These embodiments may be used by the creator of a digital multimedia file and/or a designee of the creator, to manage the use of the digital multimedia file by others. Some of these embodiments may be used by a private enterprise to manage the use of digital multimedia files that are created within the enterprise. Other embodiments may be used by an individual who creates, for example, a file of photographs and/or video, and desires to restrict access to this file to, for example, family members.

More specifically, referring to FIG. 2, at Block 250, a digital multimedia file is created. The creation of a digital multimedia file may use cameras, musical instruments, computers and/or other devices that are used to create an audio, video and/or image file. The creation of digital multimedia files are well known to those having skill in the art and need not be described further herein. At Block 210, biometric data of the creator and/or one or more designees of the creator is obtained. As was described earlier in connection with Block 110, the biometric data may be prestored, may be obtained closely spaced in time with the creation and/or may be obtained at spaced-apart time intervals and added to an existing digital multimedia file. Then, at Block 230, the biometric data is embedded into the digital multimedia file similar to operations which were described in connection with Block 130 of FIG. 1. Finally, at Block 240, a digital multimedia product including the embedded biometric data is produced, similar to operations which were described at Block 140 of FIG. 1. Accordingly, FIG. 2 describes embedding that is performed at creation of the digital multimedia file, wherein the digital multimedia file is created at a time of creation and the biometric data of the at least one authorized user also is obtained at the time of creation. At the time of creation, the authorized user may include the creator and/or at least designee of the creator of the digital multimedia file.

Figure 3:
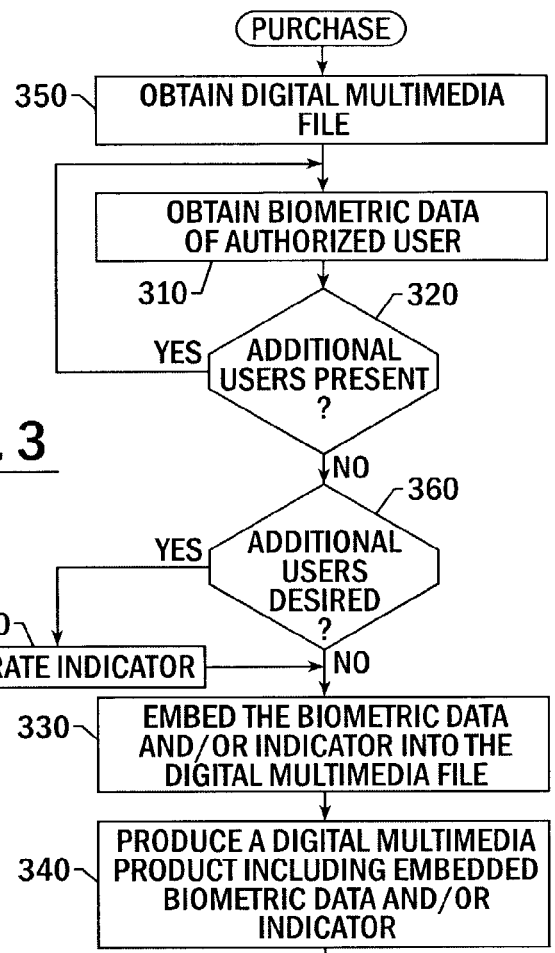
FIG. 3 is a flowchart of operations for digital rights management at a point-of-purchase according to some embodiments of the present invention.

FIG. 3 is a block diagram of some embodiments of the present invention that may be used at purchase. These embodiments may be used to govern access to an existing digital multimedia file, such as an existing music, image and/or video file. Referring now to FIG. 3, at Block 350, a digital multimedia file is obtained. In some embodiments, the digital multimedia file may be stored at a point-of-purchase. In other embodiments, the digital multimedia file may be obtained, for example, by wireless and/or wire transfer from a remote repository. Combinations of these and other techniques for obtaining a digital multimedia file also may be used.

Then, at Block 310, biometric data of an authorized user may be obtained similar to operations which were described in connection with Block 110 of FIG. 1. In purchase embodiments of FIG. 3, the authorized user may be a purchaser and/or at least one designee of the purchaser. More particularly, a purchaser of a digital multimedia product may obtain usage rights for himself or herself and/or one or more other individual users. As shown in FIG. 3, at Block 320, if these additional users are not present at the time or place of purchase or their biometric data has not be prestored, usage rights for these additional users may be purchased, and the biometric data for these users may be added later. In particular, at Block 360, if additional users are desired by the purchaser, but these users or their biometric data are not present at the time or place of purchase, an indicator may be generated that indicates the additional number of users whose rights have been authorized at purchase, at Block 370. It will be understood by those having skill in the art that any conventional technique may be used to provide an indicator, including providing a register with a number, one or more blank areas or slots for recording of biometric data, an identification of the additional users and/or other conventional techniques.

Then, referring to Block 330, the biometric data and/or the indicator are embedded into the digital multimedia file, for example using techniques that were described above in connection with Block 130 of FIG. 1. Finally, at Block 340, a digital multimedia product, including the embedded biometric data and/or the indicator, is produced similar to that which was described in connection with Block 140 of FIG. 1. Accordingly, embodiments of FIG. 3 allow the digital multimedia file and the biometric data to be obtained and embedded at purchase.

When purchasing a digital multimedia file, a user may be asked to scan or otherwise provide the user's biometric features, such as fingerprints (Block 310). This may be performed at the point-of-purchase using a local apparatus, or on the user's own device if the user is purchasing the file wirelessly. The digital multimedia file to purchase is then created with this biometric data embedded in it (Block 330). The digital multimedia product is handed over to the user, either by a file transfer (wired and/or wirelessly), a system connector such as a USB cable, a memory card, or any other storage medium (Block 340). The digital multimedia file can be used by the user on all devices able to understand the bio-enhanced format, i.e., a digital multimedia product including embedded biometric data, and possessing direct or indirect biometric input capabilities.

Figure 4:
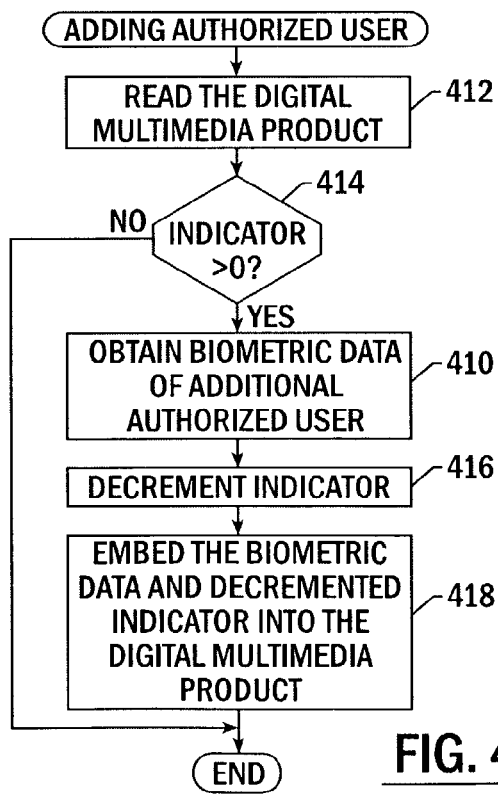
FIG. 4 is a flowchart of operations for adding an authorized user according to some embodiments of the present invention.

FIG. 4 is a flowchart of operations for adding an authorized user according to some embodiments of the present invention. Embodiments of FIG. 4 may be used, for example, when rights are purchased for additional authorized users whose biometric data is not available at purchase, and for whom an indicator has been added at Block 370 of FIG. 3. Embodiments of FIG. 4 also may be used at a creation to add additional authorized users, as was described in connection with FIG. 2.

More specifically, referring to FIG. 4, the digital multimedia product may be rendered or read at Block 412, and at Block 414 a determination can be made as to whether the indicator is greater than zero or otherwise indicates that additional users may be authorized. If not, then additional users are not authorized, and operations may end.

Still continuing with the description of FIG. 4, if additional users are authorized at Block 414, then at Block 410, biometric data of the additional authorized user(s) is obtained in a manner similar to that which was described at Block 110 of FIG. 1. The indicator then is decremented at Block 416. The biometric data and the decremented indicator are then embedded into the digital multimedia product at Block 418, in a manner similar to that which was described at Block 330 of FIG. 3.

FIG. 5 is a flowchart of rendering, i.e. using, a digital multimedia product according to some embodiments of the present invention. These embodiments of the present invention may be used to prevent at least some use (for example, viewing, listening and/or copying) of a digital multimedia file by a prospective user upon failure to match biometric data of the prospective user to biometric data that is embedded in the digital multimedia file. It will be understood that some use may be allowed without the need to match the biometric data, while other use may only be allowed upon matching of the biometric data.

More specifically, referring now to FIG. 5, at Block 510, biometric data is obtained from the prospective user of the digital multimedia product. At Block 570, biometric data that is embedded in the digital multimedia product is obtained. This data may be obtained, in some embodiments of the present invention, using a technique that is the reverse of the embedding technique that was described, for example, in Block 130 of FIG. 1. Thus, for example, decryption may be used in some embodiments. At Block 580, a comparison is made between the biometric data that was obtained from the prospective user and the biometric data that is embedded in the digital multimedia product. If they match, then at least some rendering is allowed at Block 590. If they do not match, then at least some rendering is prevented at Block 592.

FIG. 6 is a block diagram of a digital multimedia product according to some embodiments of the present invention. As shown in FIG. 6, these digital multimedia products 600 comprise a digital storage medium 610 having digital data embodied in the medium. As was described above, the digital storage medium 610 can comprise a volatile and/or nonvolatile storage medium including digital tape, digital disc and/or solid-state memory.

Still referring to FIG. 6, the digital data comprises a digital multimedia file 612, biometric data 614 of at least one authorized user and, optionally, an indicator 616 that is configured to indicate a number of additional authorized users for whom biometric data may be obtained. According to some embodiments of the present invention, the biometric data 614 and/or the indicator 616 are embedded in the digital multimedia file, using any of the techniques that were described above. Since the indicator 616 and/or the biometric data 614 are embedded in the digital multimedia file 612, the boundaries between these elements are indicated by dotted lines in FIG. 6, to indicate that a readily discernible boundary may not be present in some embodiments of the invention. Moreover, in other embodiments, the biometric data 614 and/or the indicator 616 are embedded in the digital storage medium without being embedded in the digital multimedia file 612 itself.

FIG. 7 is a block diagram of apparatus for producing a digital multimedia product according to some embodiments of the present invention. These apparatus 700 may be used at a point-of-creation, as was described in FIG. 2, a point-of-purchase, as was described in FIG. 3, and/or to add additional authorized users, as was described in FIG. 4.

Referring now to FIG. 7, these apparatus 700 include a subsystem 702 that is configured to obtain a digital multimedia file and can include creating the digital multimedia file in whole or in part. A biometric device 704 is configured to obtain biometric data of at least one authorized user of the digital multimedia product. An embedding module 706 is configured to embed the biometric data of the at least one authorized user of the digital multimedia file into the digital multimedia file. A digital multimedia product producer 708 is configured to store the digital multimedia file, including the biometric data that is embedded therein, in a digital multimedia product 716. A controller 712 is configured to control some or all of the devices mentioned in this paragraph, and/or other devices 714, such as scanners, cameras, recorders, editors and/or other devices that may be used to create and/or obtain a multimedia file. It also will be understood that, in other embodiments, the controller 712 may be configured to only allow up to a predetermined number users to be authorized and may also be configured to control the embedding module 706 to embed an indicator that indicates a number of additional authorized users for whom biometric data files may be embedded into the digital multimedia file. Finally, it will be understood that all the blocks 702–712 of apparatus 700 may be included in one or more housings, and may be embodied, in whole or in part, in one or more circuits, as was defined above.

FIG. 8 is a block diagram of apparatus for rendering a digital multimedia product according to some embodiments of the present invention. As shown in FIG. 8, these apparatus 800 include a biometric device 804 that can be similar to the biometric device 704 of FIG. 7, and that is configured to obtain biometric data of a prospective user of a digital multimedia product 816. The digital multimedia product 816 may be read by a renderer 802 using conventional techniques, to thereby obtain the biometric data that is embedded in the digital multimedia product 816. A compare module 806 and/or a controller 812 are configured to prevent at least some rendering of the digital multimedia product 816 by the renderer 802 upon failure to match the biometric data of the user that is obtained from the biometric device 804 to the biometric data that is embedded in the digital multimedia product 816. If the biometric data that is embedded in the digital multimedia product 816 matches the biometric data that is obtained by the biometric device 804, the comparing module 806 and/or the controller 812 are configured to allow at least some rendering of the digital multimedia product by the renderer 802. The renderer 802 may include a speaker, display and/or other conventional multimedia rendering devices. The controller 812 also may be configured to control the devices that were described in this paragraph, and/or other devices 814 that may be used in a multimedia renderer, including a keyboard and/or other user input/output device.

It will be understood that all blocks 802–814 of apparatus 800 may be included in one or more housings, and may be embodied, in whole or in part, in one or more circuits, as was defined above. In particular, some embodiments of the present invention that were described in FIG. 8, may employ biometric devices 804 that are embedded in rendering apparatus 800, such as consumer electronic devices where the prospective user desires to render a digital multimedia product 816. These biometric devices 804 may also be provided in accessories or peripherals that are usable with a renderer 802. In some embodiments, a universal biometric accessory/peripheral may be provided that may be usable at creation (FIG. 2), at purchase (FIG. 3) or during rendering (FIG. 5). Moreover, as was described in FIG. 7, a biometric device 704 may be provided at purchase, along with a module 706 that is configured to digitize the biometric data and embed it in the digital multimedia file before it is printed or written on the distribution medium, to produce a multimedia product 716 and provide it to the purchaser, or distribute it to a remote computer.

When the digital multimedia product 816, including the embedded biometric data, is rendered, the compare module 806 and/or the controller 812 may be configured to render the digital multimedia product 816 only when the embedded biometric data matches the biometric data that was entered through the biometric device 804 operating on the apparatus 800. In order to allow enhanced security, the compare module 806 may be tightly coupled with the controller 812, an operating system, a user interface and/or other components of the apparatus 800. It also should be noted that the biometric devices 704 used at the time of purchase should be compatible with the biometric devices 804 that are used at the time of rendering. These devices should be of the same nature, e.g., fingerprint sensing in both cases, and should also be able to digitize the fingerprints in compatible digital forms, so that these forms can be meaningfully compared and matched when properly used.

It also will be understood that, for a single rendering apparatus 800, the scanning of the biometric data need not be performed each time the user uses the digital multimedia product 816, but may only be performed on a periodic basis, for example once per day, or when the apparatus 800 is activated, in order to reduce cumbersome usage scenarios. Moreover, in some embodiments, the user may scan the user's biometrics once in a usage period for all bio-enhanced files, not once for every bio-enhanced file. However, in other embodiments, a biometric scan may be performed each time the digital multimedia product 816 is activated.

The present invention may be embodied in a wireless terminal, such as a wireless radiotelephone that is equipped, for example, with a fingerprint sensor, which may be used to purchase digital multimedia, such as music or videos, from a Sony Music Infotainment point equipped with the same biosensor. In other embodiments, a digital recording camera may be equipped with a biosensor and a memory stick, as well as software to embed biometric data in a video file when it is created. Thus, embodiments of the invention may be used with private files. Files stored on a memory stick may embed the biometric data of several persons, and may be usable on any rendering product, for example a television, that is equipped with a memory stick and access to biometric data.

Embodiments of the invention may be used on any digital multimedia file. Although some embodiments of the present invention may be used commercially for digital rights management of music or video files, other embodiments of the present invention may be used with other digital multimedia files, for commercial or private digital rights management. According to some embodiments of the present invention, the user can read the file with any device, whether it is a computer, a consumer electronics apparatus and/or a wireless device, if this device can use a biometric sensor that is embedded or peripheral to the device and/or can gain access to the biometric data.

It will be understood that embodiments of the present invention may only need the presence of a user to obtain a biometric signal, and may not prevent the digital multimedia file from being used on an apparatus that does not belong to the user. Thus, in some embodiments, a user can transport a digital multimedia product wherever the user wishes, and can use it on any device belonging to the user or someone else, as long as the user is there to present the user's personal biometric features to the rendering apparatus. Some embodiments of the invention may also be used to provide digital rights management for private files that are designed for the user's personal use and/or use by a small group of people. For example, a user may want to record a personal video clip with a digital camera, and prevent anybody else from using it by embedding it with his own biometrics. Moreover, some embodiments of the present invention may be extended to a specific number of users, as long as they enter their biometrics together at the purchasing time, at the creation time and/or subsequently using an indicator. Thus, for example, members of a family can embed their biometric data in a private digital video, to prevent its use by non-family members if the file is lost, transferred or stolen. If used on a device, only one user among the authorized users may be needed to unlock the file.

Finally, it will be understood that biometric techniques according to some embodiments of the present invention may not be used as proof of identity or authentication. There need not be any assumption that the person who presents the biometrics at the digital multimedia product creation time and/or at rendering is the person he or she claims to be. Embodiments of the invention can ensure that the person and/or designees of the person who purchased or created the file are the ones who are authorized to use it, but need not raise privacy concerns because the identity of the creator and/or authorized user need not be known.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A digital rights management method comprising:
   embedding biometric data of at least one authorized user of a digital multimedia product into the digital multimedia product to thereby control use of the digital multimedia product by a prospective user who obtains access to the digital multimedia product;
   determining whether additional users will be authorized for the digital multimedia product;
   embedding an indicator that corresponds to a number of additional users who may be authorized for the digital multimedia product, into the digital multimedia product;
   storing the digital multimedia product, including the biometric data of the at least one authorized user and the indicator that are embedded therein, in a digital storage medium;
   embedding biometric data of an additional user of the digital multimedia product into the digital storage medium in response to the indicator that is stored in the digital storage medium indicating that at least one additional user of the digital multimedia product may be authorized;
   decrementing the indicator in response to the embedding of the biometric data of the additional user of the digital multimedia product into the digital storage medium; and
   embedding the decremented indicator into the digital storage medium.

2. A digital rights management method according to claim 1 wherein the at least one authorized user of the digital multimedia product comprises a purchaser, a creator and/or at least one designee of the purchaser and/or the creator of the digital multimedia product.

3. A digital rights management method according to claim 1 wherein the prospective user comprises the at least one authorized user and/or others who obtain access to the digital multimedia product.

4. A digital rights management method according to claim 1 wherein the embedding is performed upon creation of the digital multimedia product, wherein the at least one authorized user comprises a creator of a digital multimedia file that corresponds to the digital multimedia product and/or at least one designee of the creator, and wherein the embedding is preceded by:
   creating the digital multimedia file; and
   obtaining the biometric data of the creator and/or the at least one designee of the creator.

5. A digital rights management method according to claim 1 wherein the embedding is performed upon purchase of the digital storage medium that stores the digital multimedia product, wherein the at least one authorized user comprises a purchaser of the digital storage medium that stores the digital multimedia product and/or at least one designee of the purchaser, and wherein the embedding is preceded by:
   obtaining a digital multimedia file that corresponds to the digital multimedia product; and
   obtaining the biometric data of the purchaser and/or the at least one designee of the purchaser.

6. A digital rights management method according to claim 1 wherein the embedding is repeatedly performed up to a predetermined number of times to thereby embed biometric data of up to the predetermined number of authorized users of the digital multimedia product into the digital multimedia product storage medium.

7. A digital rights management method according to claim 1 wherein the embedding is followed by:
   preventing at least some use of the digital storage medium that stores the digital multimedia product by the prospective user upon failure to match biometric data of the prospective user to the biometric data that is embedded in the digital storage medium.

8. A digital rights management method according to claim 7 wherein the preventing comprises:
   obtaining biometric data from the prospective user; and
   comparing the biometric data that is obtained from the prospective user to the biometric data that is embedded in the digital storage medium that stores the digital multimedia product.

9. A digital rights management method according to claim 8 wherein the obtaining is performed upon activation of a digital multimedia rendering apparatus by the prospective user and wherein the comparing is performed upon activation of the digital multimedia product that is stored in the digital storage medium at the digital multimedia rendering apparatus by the prospective user.

10. Apparatus for producing a digital multimedia product comprising:
    means for obtaining a digital multimedia file;
    means for obtaining biometric data of at least one authorized user of the digital multimedia product;
    means for embedding the biometric data of the at least one authorized user of the digital multimedia product into the digital multimedia file;
    means for determining whether additional users will be authorized for the digital multimedia product;
    means for embedding an indicator that corresponds to a number of additional users who may be authorized for the digital multimedia product, into the digital multimedia product;
    means for storing the digital multimedia file including the biometric data and the indicator that are embedded therein in a digital storage medium;
    means for embedding biometric data of an additional user of the digital multimedia product into the digital storage medium in response to the indicator that is stored in the digital storage medium indicating that at least one additional user of the digital multimedia product may be authorized;

means for decrementing the indicator in response to the embedding of the biometric data of the additional user of the digital multimedia product into the digital storage medium; and means for embedding the decremented indicator into the digital storage medium.

11. Apparatus according to claim 10 wherein the at least one authorized user of the digital multimedia product comprises a purchaser of the digital multimedia product, a creator of the digital multimedia file and/or at least one designee of the purchaser and/or the creator.

12. Apparatus according to claim 10 wherein the means for obtaining comprises means for creating the digital multimedia file in response to input by a creator of the digital multimedia file and/or at least one designee of the creator of the digital multimedia file and wherein the at least one authorized user comprises the creator of the digital multimedia file and/or the at least one designee of the creator.

13. Apparatus according to claim 10 wherein the means for obtaining comprises means for obtaining the digital multimedia file in response to a request by a purchaser of the digital storage medium that stores the digital multimedia product and wherein the at least one authorized user comprises the purchaser of the digital storage medium that stores the digital multimedia product and/or at least one designee of the purchaser.

14. Apparatus according to claim 10 wherein the means for obtaining biometric data comprises means for obtaining biometric data of up to a predetermined number of authorized users of the digital storage medium that stores the digital multimedia product and wherein the means for embedding comprises means for embedding the biometric data of up to the predetermined number of authorized users of the digital storage medium that stores the digital multimedia product into the digital storage medium.

15. Apparatus for producing a digital multimedia product comprising:
 a subsystem that is configured to obtain a digital multimedia file;
 a biometric device that is configured to obtain biometric data of at least one authorized user of the digital multimedia product;
 a module that is configured to embed the biometric data of the at least one authorized user of the digital multimedia product into the digital multimedia file; and
 a digital multimedia product producer that is configured to store the digital multimedia file including the biometric data that is embedded therein in a digital storage medium;

wherein the module is further configured to determine whether additional users will be authorized for the digital multimedia product and to embed in the digital multimedia file an indicator that is configured to indicate a number of additional authorized users for whom biometric data may be embedded into the digital multimedia file, and wherein the digital multimedia product producer is further configured to store the digital multimedia file including the biometric data and the indicator that are embedded therein in the digital storage medium; and wherein the module is still further conflaured to embed biometric data of an additional user of the digital multimedia product into the digital storage medium in response to the indicator that is stored in the digital storage medium indicating that at least one additional user of the digital multimedia product may be authorized, to decrement the indicator in response to the embedding of the biometric data of the additional user of the digital multimedia product into the digital storage medium and to embed the decremented indicator into the digital storage medium.

16. Apparatus according to claim 15 wherein the at least one authorized user of the digital multimedia product comprises a purchaser of the digital multimedia product, a creator of the digital multimedia file and/or at least one designee of the purchaser and/or the creator.

17. Apparatus according to claim 15 wherein the subsystem is configured to create the digital multimedia file in response to input by a creator of the digital multimedia file and/or at least one designee of the creator of the digital multimedia file and wherein the at least one authorized user comprises the creator of the digital multimedia file and/or the at least one designee of the creator.

18. Apparatus according to claim 15 wherein the subsystem is configured to obtain the digital multimedia file in response to a request by a purchaser of the digital multimedia product and wherein the at least one authorized user comprises the purchaser of the digital multimedia product and/or at least one designee of the purchaser.

19. Apparatus according to claim 15 wherein the biometric device is configured to obtain biometric data of up to a predetermined number of authorized users of the digital multimedia product and wherein the module is configured to embed the biometric data of up to the predetermined number of authorized users of the digital multimedia product into the digital storage medium.

* * * * *

UNITED STATES PATENT AND TRADEMARK OFFICE
CERTIFICATE OF CORRECTION

PATENT NO.       : 7,174,567 B2                                            Page 1 of 1
APPLICATION NO.  : 10/267560
DATED            : February 6, 2007
INVENTOR(S)      : Keramane It is certified that error appears in the above-identified patent and that said Letters Patent is hereby corrected as shown below:

<u>Column 12,</u>

Line 20- 21:  Delete "multimedia product"

<u>Column 14,</u>

Line 12:  Correct "conflaured" to read --configured--

Signed and Sealed this

First Day of May, 2007

JON W. DUDAS
*Director of the United States Patent and Trademark Office*